US012653152B1

(12) United States Patent
Higdon et al.

(10) Patent No.: US 12,653,152 B1
(45) Date of Patent: *Jun. 16, 2026

(54) ADJUSTABLE ANIMAL VEST AND METHODS OF USING SAME

(71) Applicant: Higdon Outdoors, LLC, Paducah, KY (US)

(72) Inventors: Benjamin Robert Higdon, Paducah, KY (US); Brook A. Richard, Paducah, KY (US); Ira McCauley, Defiance, MO (US)

(73) Assignee: Higdon Outdoors, LLC, Paducah, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/951,507

(22) Filed: Nov. 18, 2024

Related U.S. Application Data

(63) Continuation of application No. 18/080,259, filed on Dec. 13, 2022, now Pat. No. 12,219,924, which is a continuation of application No. 16/811,962, filed on Mar. 6, 2020, now Pat. No. 11,559,040.

(60) Provisional application No. 62/901,484, filed on Sep. 17, 2019.

(51) Int. Cl.
*A01K 13/00* (2006.01)

(52) U.S. Cl.
CPC .................................. *A01K 13/006* (2013.01)

(58) Field of Classification Search
CPC ...................................................... A01K 13/006
See application file for complete search history.

(56) References Cited

U.S. PATENT DOCUMENTS

| | | | | |
|---|---|---|---|---|
| 3,248,852 | A | 5/1966 | Schwartz | |
| 5,068,921 | A * | 12/1991 | Jones | A01K 13/006 |
| | | | | 2/2.5 |
| 6,123,049 | A * | 9/2000 | Slater | A01K 27/002 |
| | | | | 54/79.2 |

(Continued)

FOREIGN PATENT DOCUMENTS

| | | |
|---|---|---|
| JP | 2007-209273 A | 8/2007 |

OTHER PUBLICATIONS

Jesse Medina, Tanglefree Flight Series Dog Vest Review*, https://www.youtube.com/watch?app=desktop&v=vowV1ydemz8, screenshots (3 pages).

(Continued)

*Primary Examiner* — Joshua D Huson
*Assistant Examiner* — Edgar Reyes
(74) *Attorney, Agent, or Firm* — C. Brandon Browning; Maynard Nexsen PC

(57) ABSTRACT

An adjustable animal vest and methods of using same, the vest including an attachment panel for placement between a neck and a waist of an underside of an animal, a first fastening panel for placement on a first lateral side of the animal, a second fastening panel for placement on a second lateral side of the animal, a first cover panel for placement over the first fastening panel on the first lateral side of the animal, and a second cover panel for placement over the second fastening panel on the second lateral side of the animal. Upon proper panel placement on the animal, complementary attachment features located on inner and outer surfaces of the panels are fastened to each other to form the adjustable animal vest assembly.

24 Claims, 10 Drawing Sheets

(56) References Cited

U.S. PATENT DOCUMENTS

| | | | |
|---|---|---|---|
| 6,584,939 B1 * | 7/2003 | Brezinski | A01K 13/008 |
| | | | D30/145 |
| 9,204,620 B2 | 12/2015 | Hamilton | |
| D905,353 S * | 12/2020 | Giesen | D30/152 |
| D948,810 S * | 4/2022 | Elam | D30/152 |
| D957,752 S * | 7/2022 | Ohanian | D30/152 |
| 2006/0090711 A1 | 5/2006 | Richards | |
| 2009/0205586 A1 | 8/2009 | Matthews | |
| 2010/0043725 A1 * | 2/2010 | Hall | A01K 13/006 |
| | | | 54/79.4 |
| 2010/0199927 A1 | 8/2010 | Cigard et al. | |
| 2010/0240272 A1 * | 9/2010 | Cosson | B63C 9/115 |
| | | | 441/106 |
| 2010/0277945 A1 * | 11/2010 | Hurwitz | A01K 13/003 |
| | | | 362/570 |
| 2012/0024239 A1 | 2/2012 | Forbes | |
| 2014/0041599 A1 | 2/2014 | Gyula | |
| 2015/0020755 A1 | 1/2015 | Chortyk-White et al. | |
| 2018/0303068 A1 * | 10/2018 | Chen | A01K 27/009 |
| 2019/0200572 A1 * | 7/2019 | Criswell | A01K 13/006 |
| 2019/0200573 A1 | 7/2019 | Smith | |
| 2020/0404887 A1 | 12/2020 | Akenhead et al. | |
| 2021/0015076 A1 * | 1/2021 | Ebarb | A01K 13/006 |

OTHER PUBLICATIONS

Jesse Medina, Tanglefree Flight Series Dog Vest Review*, https://www.youtube.com/watch?v=vowV1ydemz8, screenshots (3 pages). The full-coverage safety vest on p. 21 of the attached 2017 Browning Pet Collection document.

* cited by examiner

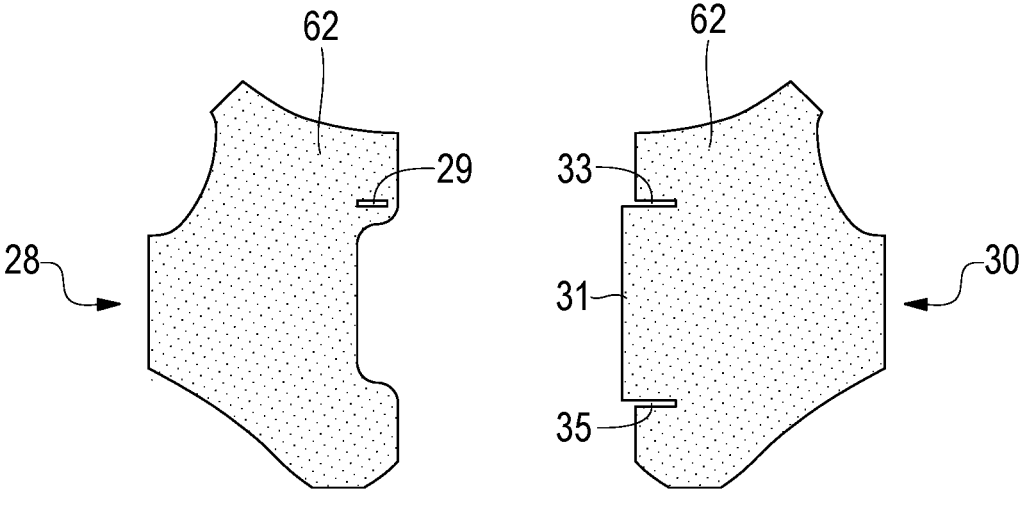
FIG. 6A                    FIG. 6B

ADJUSTABLE ANIMAL VEST AND METHODS OF USING SAME

RELATED APPLICATIONS

This application is a continuation of and claims priority to U.S. patent application Ser. No. 18/080,259 filed on Dec. 13, 2022, titled "Adjustable Animal Vest and Methods of Using Same," which is a continuation of and claims priority to U.S. patent application Ser. No. 16/811,962 filed on Mar. 6, 2020, titled "Adjustable Animal Vest and Methods of Using Same," which cites the benefit of U.S. Provisional Patent Application No. 62/901,484 filed on Sep. 17, 2019, titled "Adjustable Animal Vest," the entire contents of which are incorporated herein by reference.

TECHNICAL FIELD

The present invention is directed to a vest for use by an animal and, more particularly, a vest including a plurality of independently adjustable panels for enabling a custom fit of the vest when worn by a quadruped.

BACKGROUND OF INVENTION

Animals often undertake roles, activities, or have conditions that can be aided or improved by wearing an exterior garment or structure. For instance, service animals utilize garments that signify their role as a support animal and military support animals typically wear protective garments that have an athletic fit to ensure animal agility and safety during tasks. In other cases, animals are fitted with sporting garments that allow for running, swimming and other sport-related physical activities in outdoor terrain and weather conditions. In all cases, an animal benefits from a versatile garment configuration so that the garment fits and covers the desired areas of the animal, offering identification, protection and other desired features while allowing unimpeded movement and comfort.

Garments for quadrupeds, such as dogs and horses, are often vests that cover portions of the animal's torso and extend from a neck region to a waist region. Current vests are typically available in limited sizes and have few, if any, points of adjustment. In these cases, the vest often does not closely fit the animal and diminishes the animal's ability to undertake desired tasks, activities, and roles. Thus, what is needed is an adjustable animal vest that includes multiple points of adjustment and panel components, assuring a close fit to the torso of the animal and allowing the animal to wear the vest in comfort while undertaking activities. Once adjusted for the animal, the vest should be easily assembled and disassembled on the animal, minimizing time spent donning and removing the vest with each use.

SUMMARY OF THE INVENTION

The present invention is directed to an adjustable animal vest assembly and methods of using same. In one aspect, the invention is directed to an adjustable animal vest assembly having an attachment panel for placement between a neck and a waist of an underside of an animal, the attachment panel including panel material with a neck curve, a first shoulder curve, a second shoulder curve, a waist curve and a plurality of hoop-and-loop fastener sections. The hoop-and-loop fastener sections include female loop sections on an inner attachment panel surface configured to face towards the animal and male hook sections on an outer attachment panel surface configured to face away from the animal. Female loop sections include at least one inner first section between the first shoulder curve and the neck curve, at least one inner second section between the second shoulder curve and the neck curve, at least one inner third section between the first shoulder curve and the waist curve and at least one inner fourth section between the second shoulder curve and the waist curve. Male hook sections include at least one outer first section between the first shoulder curve and the neck curve, at least one outer second section between the second shoulder curve and the neck curve, at least one outer third section between the first shoulder curve and the waist curve, and at least one outer fourth section between the second shoulder curve and the waist curve. The vest assembly further includes a first fastening panel for placement on a first lateral side of the animal with panel material having male hook fasteners on a first outer fastening surface configured to face away from the animal and a second fastening panel for placement on a second lateral side of the animal with panel material having male hook fasteners on a second outer fastening surface configured to face away from the animal. A first cover panel is provided for placement over the first fastening panel on the first lateral side of the animal with panel material having female loop fasteners on a first inner cover surface configured to face towards the animal, and a second cover panel is provided for placement over the second fastening panel on the second lateral side of the animal with panel material having female loop fasteners on a second inner cover surface configured to face towards the animal.

The at least one inner first section and one inner third section of the attachment panel are configured to fasten to the first outer fastening surface of the first fastening panel. The at least one inner second section and one inner fourth section of the attachment panel are configured to fasten to the second outer fastening surface of the second fastening panel. The first and second fastening panels are configured to be attached along a spine of the animal to form an inner vest structure. Additionally, the at least one outer first section and one outer third section of the attachment panel and the first outer fastening surface are configured to attach to the first inner cover surface of the first cover panel, and the at least one outer second section and one outer fourth section of the attachment panel and the second outer fastening surface are configured to attach to the second inner cover surface of the second cover panel to form the adjustable animal vest assembly.

In some embodiments, the animal is a dog or a horse. In some instances, the panel material is configured for providing buoyancy, thermal insulation, thermal regulation, cooling and/or high tensile strength, and in other instances, the vest assembly includes storage regions attached to the panel material. In some embodiments, the first and second fastening panels each further include complementary tracks of a zipper along, such that the attachment of the first and second fastening panels along the spine of the animal is achieved by zipping the zipper. In some embodiments, the vest assembly further includes a handle attached to panel material and configured to be positioned near the spine of the animal when the vest assembly is placed on the animal. In some instances, the handle is attached to the second outer fastening surface of the second fastening panel, and a handle flap on the second cover panel is configured to be located over the handle when the vest assembly is placed on the animal, such that the handle is accessible on an exterior of the vest assembly when the handle flap is open. In some embodiments, the vest assembly further includes a ring attached to panel material and configured to be positioned near the spine of the animal when the vest assembly is placed on the animal. In some instances, the ring is attached to the second outer fastening surface of the second fastening panel and configured to be accessible on an exterior of the vest assembly when the vest assembly is placed on the animal by passing the ring through a fastening ring slot on the first fastening panel and a cover ring slot on the first cover panel.

In another aspect of the invention, there is provided a method of assembling an adjustable animal vest. The method includes attaching a first and a second fastening panel along a spine of the animal, wherein the first fastening panel is placed on a first lateral side of the animal and has panel material with male hook fasteners on a first outer fastening surface configured to face away from the animal, and wherein the second fastening panel is placed on a second lateral side of the animal and has panel material with male hook fasteners on a second outer fastening surface configured to face away from the animal. In a following step, an attachment panel is fastened to the first and second fastening panels, the attachment panel including panel material with a neck curve, a first shoulder curve, a second shoulder curve, a waist curve, and a plurality of hoop-and-loop fastener sections, the plurality of hoop-and-loop fastener sections having female loop sections on an inner attachment panel surface configured to face towards the animal and male hook sections on an outer attachment panel surface configured to face away from the animal. Female loop sections include at least one inner first section between the first shoulder curve and the neck curve, at least one inner second section between the second shoulder curve and the neck curve, at least one inner third section between the first shoulder curve and the waist curve and at least one inner fourth section between the second shoulder curve and the waist curve. Male hook sections include at least one outer first section between the first shoulder curve and the neck curve, at least one outer second section between the second shoulder curve and the neck curve, at least one outer third section between the first shoulder curve and the waist curve and at least one outer fourth section between the second shoulder curve and the waist curve. The fastening is undertaken such that the attachment panel is located between a neck and a waist on an underside of the animal and at least one inner first section and one inner third section of the attachment panel are attached to the first outer fastening surface of the first fastening panel and the at least one inner second section and one inner fourth section of the attachment panel are attached to the second outer fastening surface of the second fastening panel to form an inner vest structure.

Next, a first cover panel and a second cover panel are attached to the inner vest structure. The first cover panel is placed over the first fastening panel on the first lateral side of the animal with female loop fasteners on a first inner cover surface attached to the first outer fastening surface, the at least one outer first section of the attachment panel and the least one outer third section of the attachment panel. The second cover panel is placed over the second fastening panel on the second lateral side of the animal with female loop fasteners on a second inner cover surface attached to the second fastening panel, the least one outer second section of the attachment panel and the least one outer fourth section of the attachment panel. In this way, the adjustable animal vest is fitted to and assembled on the animal.

In some embodiments, the attachment of the first and second fastening panels along the spine of the animal is achieved using a zipper connecting a spine-adjacent end of the first fastening panel with a spine-adjacent end of the second fastening panel. In some embodiments, a handle is attached to the second outer fastening surface of the second fastening panel and a handle flap is located on the second cover panel, such that after the attachment of the first and second cover panels, the handle flap is located over the handle and the handle is accessible on an exterior of the vest assembly when the handle flap is open. In some embodiments, a ring is attached to the second outer fastening surface of the second fastening panel, a fastening ring slot is located on the first fastening panel, and a cover ring slot is located on the first cover panel, such that after attachment of the first and second cover panels, the ring is accessible on an exterior of the vest assembly by passing the ring through the fastening ring slot and the cover ring slot.

A further understanding of the nature and advantages of the present invention will be realized by reference to the remaining portions of the specification and the drawings.

BRIEF DESCRIPTION OF DRAWINGS

The present disclosure same can be better understood, by way of example only, with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 6A depicts a first cover panel of the dog vest assembly of FIG. 2.

FIG. 6B depicts a second cover panel of the dog vest assembly of FIG. 2.

DETAILED DESCRIPTION OF THE INVENTION

Figure 1:
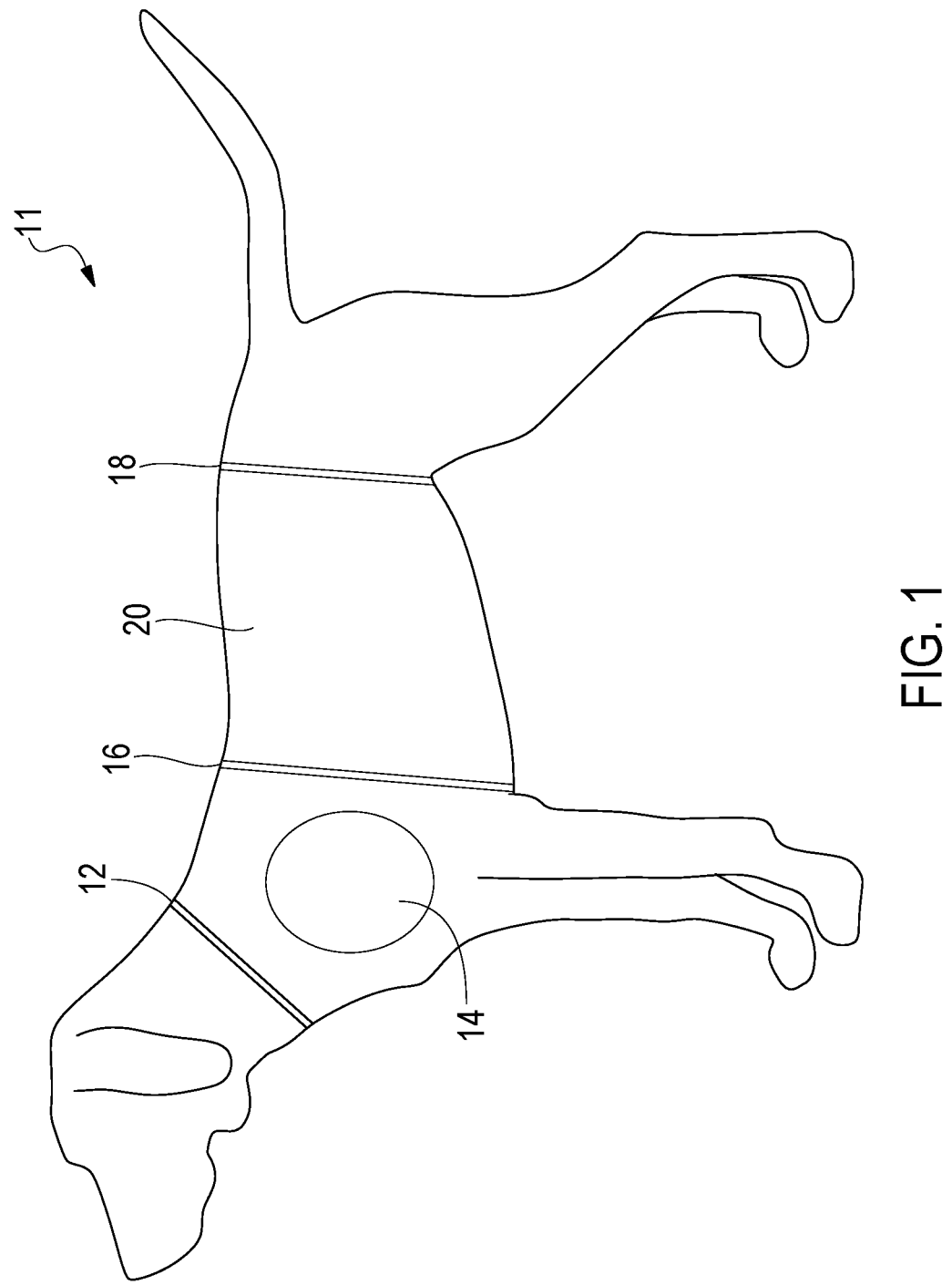
FIG. 1 is an elevational view of a side of a dog.
Figures 7A, 7B:
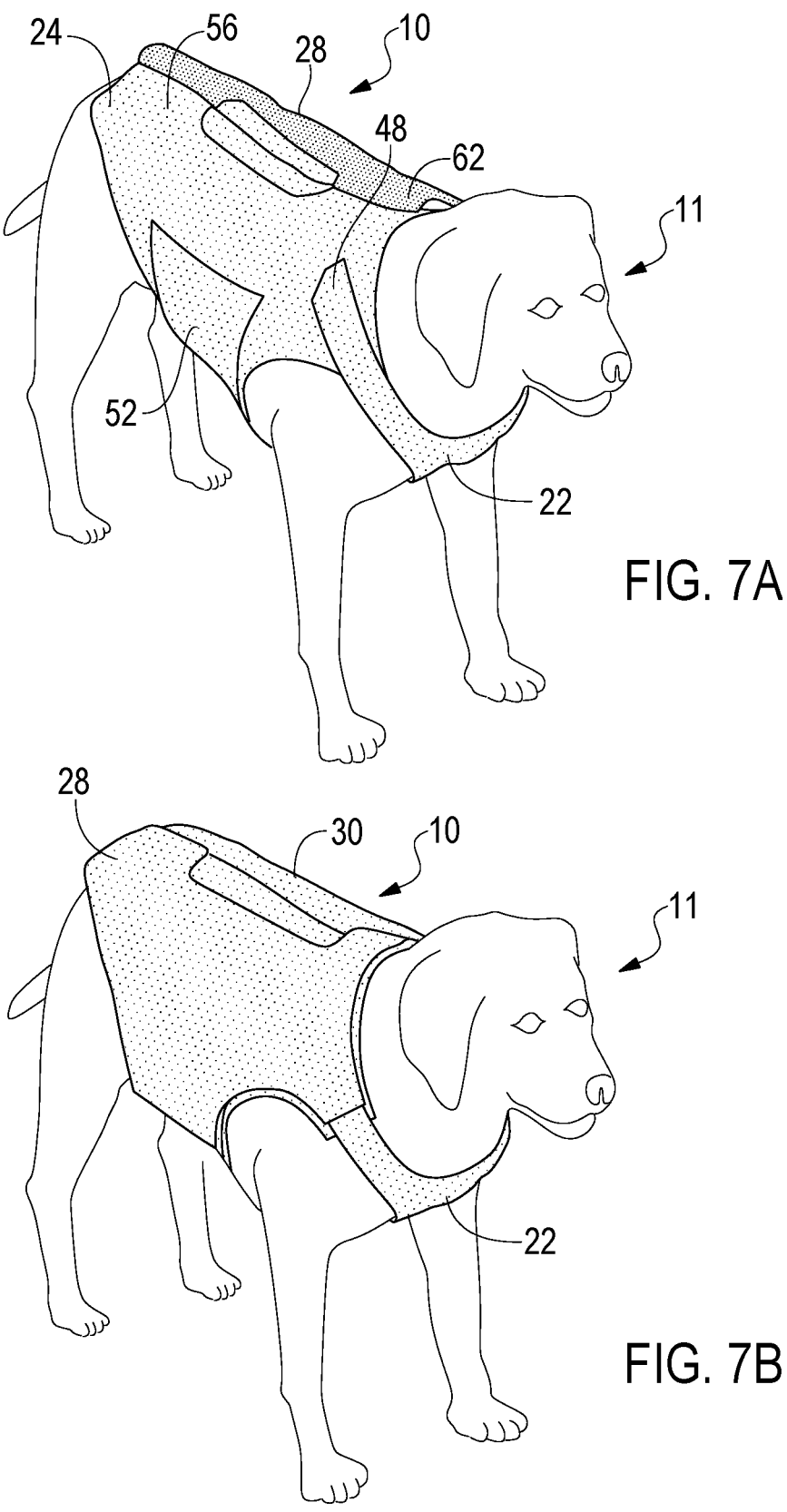
FIG. 7A is a perspective view of the first cover panel of FIG. 6A coupled to the inner vest structure of FIG. 5 in an open configuration.
FIG. 7B is a perspective view of the first cover panel of FIG. 7A coupled to the inner vest structure in a closed configuration.
Figures 8A, 8B:
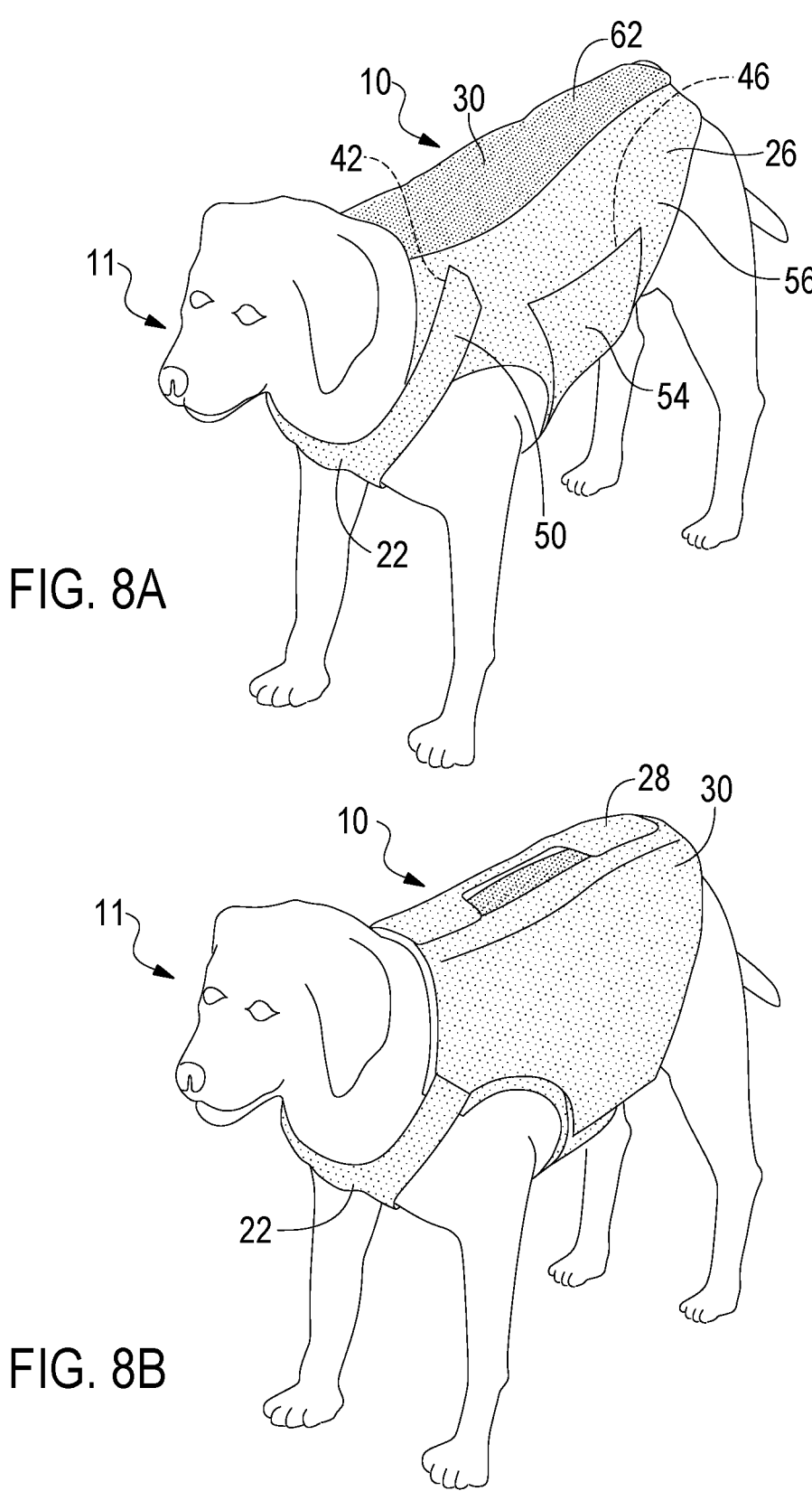
FIG. 8A is a perspective view of the second cover panel of FIG. 6B coupled to the inner vest structure of FIG. 5 in an open configuration.
FIG. 8B is a perspective view of the second cover panel of FIG. 8B coupled to the inner vest structure in a closed configuration.
Figure 9:
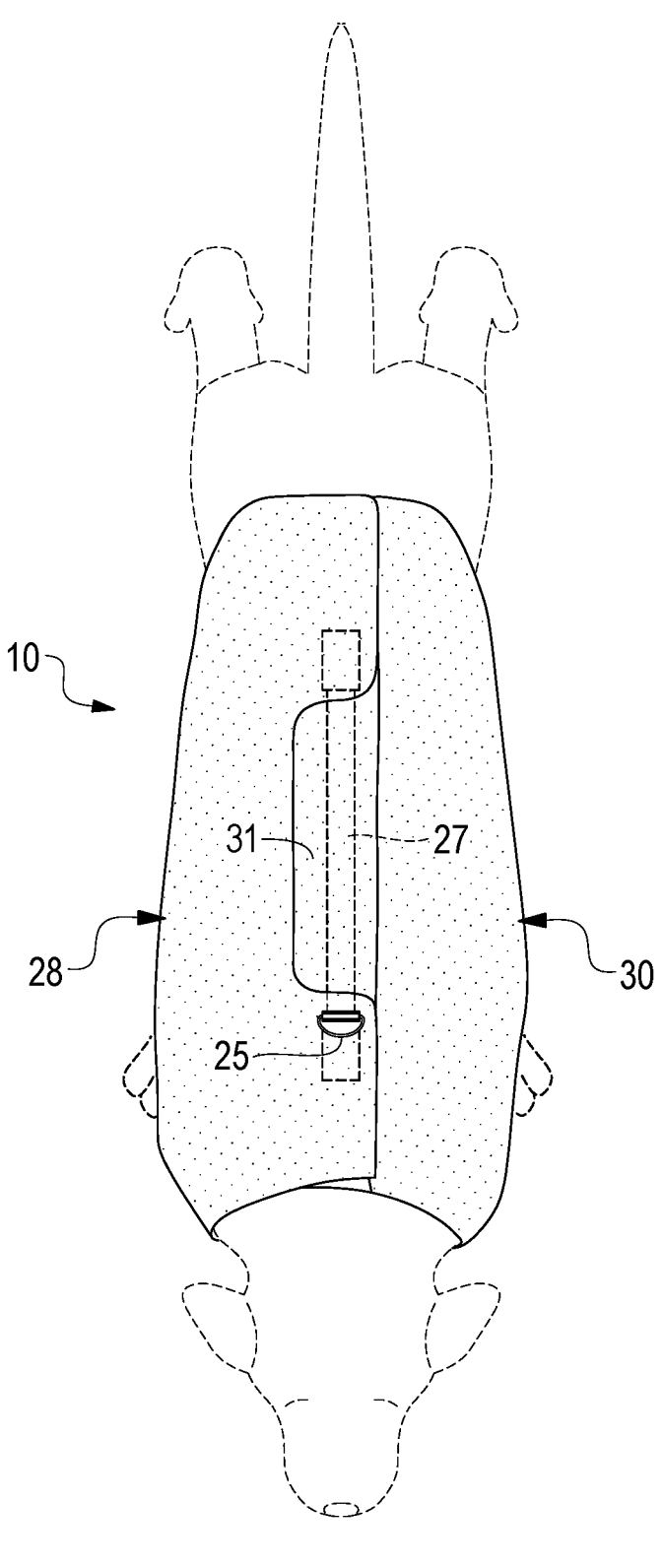
FIG. 9 a dorsal view of a dog wearing the quadruped vest assembly of FIG. 2 in a fully assembled arrangement.
Figure 10:
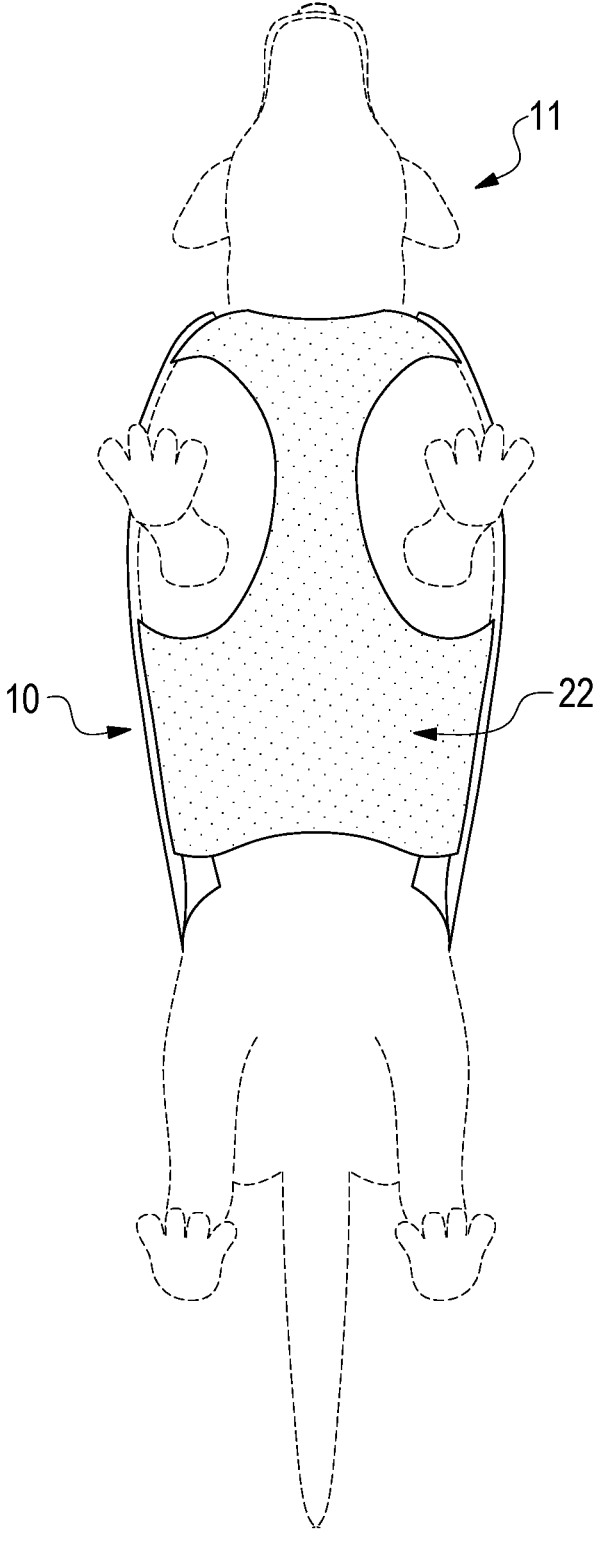
FIG. 10 a ventral view of a dog wearing the quadruped vest assembly of FIG. 2 in a fully assembled arrangement.

The present invention is directed to an adjustable vest for use by a quadruped and methods of using same. FIG. 1 depicts a quadruped, namely, a dog with which the animal vest may be used. FIGS. 2 through 4B and 6A and 6B depict the animal vest of the present invention and its component panels in unassembled states. FIG. 5 depicts an inner vest structure composed of an attachment panel and a pair of opposing fastening panels of the animal vest of the present invention assembled on a dog. FIGS. 7A and 7B depict cover panels of the animal vest of the present invention coupled to the inner vest structure in open arrangements. FIGS. 8A and 8B depict the cover panels coupled to the inner vest structure in closed arrangements. FIGS. 9 and 10 depict dorsal and ventral views of a dog on which the adjustable vest is fully assembled. Generally, the adjustable animal vest includes a plurality of separable panels that are capable of being attached to each other in configurations that allow a comfortable and secure fit to quadrupeds of varying sizes. The fit of the adjustable animal vest is such that empty space between the quadruped and the interior of the adjustable animal vest is reduced. The fit of the adjustable animal vest increases protection to the quadruped and facilitates normal agility and movement of the quadruped.

As used herein, a "quadruped" intended for outfitting with the adjustable vest is an animal which has four feet, especially an ungulate mammal. Exemplary quadrupeds include dogs and horses. An underside of a quadruped may refer to the ventral side of the quadruped. For instance, the chest of a dog is located on an underside of the dog.

As used herein, an "inner surface" of a panel or vest refers to a surface facing toward or configured to face toward the body of the animal during or after vest assembly.

As used herein, an "outer surface" of a panel or vest refers to a surface facing away from or configured to face away from the body of the animal during or after vest assembly.

Applications for the adjustable animal vest of the present invention to be considered include military applications, where the vest panels are fabricated from bulletproof material or capable of storing removable bulletproof plates. Additionally, the vest panel materials may be adapted to protect against chemical damage. Vests configured for military applications are intended to protect and cover an animal's vital organs and provide an athletic fit for satisfactory mobility and agility. The vests may also be configured for use with service animals as a form of identification. In this instance, an adjustable animal vest may signify the identity of the service animal and serves as a "working uniform." Additionally, the adjustable animal vest may be configured for therapeutic purposes where the vest hugs an animal closely or provides compressive pressure at predetermined locations on the animal's body to provide a sense of comfort and to reduce stress and anxiety. The vests may also be used in sporting applications, including running, and swimming, where an animal may experience inclement weather conditions such as cold temperatures or rough terrain. In these instances, the adjustable animal vest may be configured to offer flotation, protection against the cold or other advantages as the animal undertakes sporting tasks, such as retrieving downed waterfowl, while preserving or enhancing movement and agility.

Additional features of the adjustable animal vest include flotation, impact resistance, armor, temperature regulation, therapeutic positioning or fit, visibility, fashion, exercise and training components, storage, and/or restraint features or materials. For instance, visible materials or features may be added to the vest for fashion or beauty purposes, for identification or camouflaging purposes, or for visibility. Such features include reflective or luminescent materials, electronic lights, logos or colors denoting roles or organizations, or colors and textures of materials that are viewed as fashionable. In instances where temperature regulation is intended, the adjustable vest may be manufactured to include, for instance, thick or insulated panels for warmth, breathable or thin panels for cooling, or built in heating or cooling elements. Pockets are added to panels in some instances to provide storage for desired materials or regions for the inclusion of training weights. Anchor points may be added to vest panels in some instances to attach and store materials on the animal or for attachment of animal restraint materials, such as leashes. Specialized vest materials are sometimes used, such as Kevlar® for protection or buoyancy materials for flotation assistance. High tensile strength materials, such as Kevlar®, are in some instances used as bulletproof materials. Other applications not specifically mentioned are compatible with the adjustable animal vest and methods of using same.

Referring to FIG. 1, an exemplary animal 11 (e.g., a dog) is depicted. Previous vests for animals 11 often fail to fit certain regions of the animal 11 closely, leaving openings between the vest and the body of the animal 11. These regions are difficult to fit closely using previous vests, as these previous vests are typically available in limited, non-adjustable sizes. However, different animals 11 often vary in size and proportion, and an individual animal 11 may vary in size and proportion over its lifetime. The present disclosure describes an adjustable animal vest 10 that is versatile in size, shape, and application, where adjustability is achieved by including multiple adjustment points between panels of adjustable animal vest 10.

In FIG. 1, regions of animal 11 for fit consideration are indicated. These regions include a base of the animal's neck 12 and the animal's shoulders 14, chest 16, waist 18, and torso 20 region. More specifically, considerations for adjustment of adjustable animal vest 10 include neck shape and width, shoulder opening size and shape, chest diameter, size, and shape, waist diameter and shape, and torso area, size, and shape. In certain instances, ill fit at these points allows wind, water and debris to enter or results in discomfort to animal 11 during movement. Previous vests generally lack adjustment points for each of these regions. For example, prior art vests are generally offered in sizes ranging from extra-small to triple extra-large with extra small neck dimensions ranging from 14.5-15 inches, extra small chest dimensions ranging from 22-24 inches, extra small waist dimensions ranging from 21-22 inches, extra-large neck dimensions ranging from 19-28 inches, extra-large chest dimensions ranging from 33-35 inches and extra-large waist dimensions ranging from 29-34 inches. Thus, sizing of prior art vests is limited to specific sizes that vary according to manufacturer, and such vests are often limited to a specific dimension for each region of animal 11. The inflexibility of prior art vests with respect to adjustability also creates situations that do not accommodate animal growth or that require different vests to be purchased for different animals 11 belonging to one owner. The present adjustable animal vest 10 is configured to be adjusted to fit closely to an individual animal over its lifetime, as well as to be outfitted on different animals 11 of differing sizes.

Figure 2:
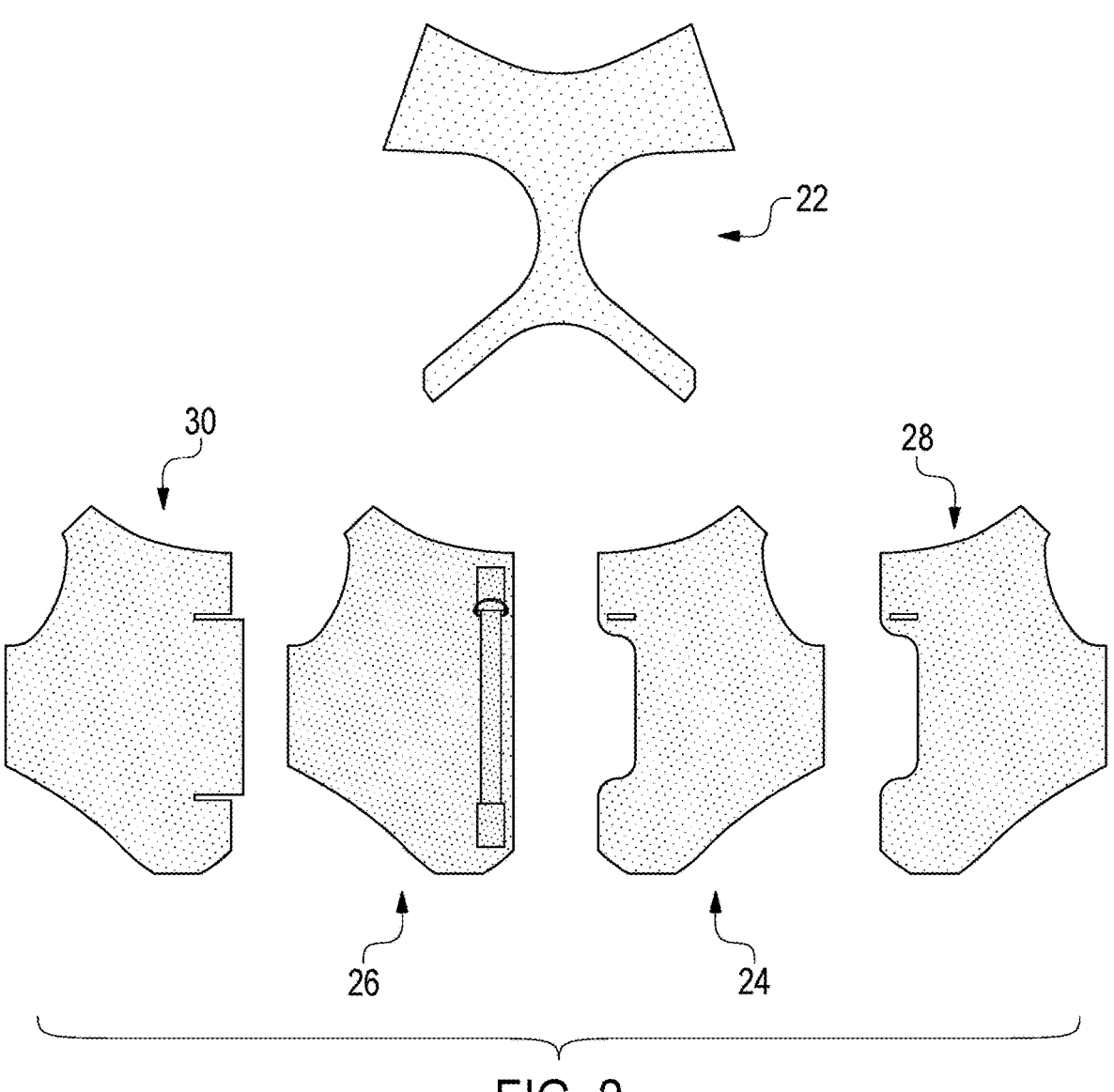
FIG. 2 depicts panels of a dog vest assembly in accordance with the present invention in an unassembled arrangement.

Referring now to FIG. 2, adjustable animal vest 10 is assembled from separable panels, each panel exhibiting a unitary construction, though it is anticipated that one or more of the panels may be fabricated from multiple panel components. Panels of adjustable animal vest 10 include an attachment panel 22, which is positioned between neck 12 and waist 18 regions on the underside of animal 11 upon vest assembly. Other panels include a first fastening panel 24, a second fastening panel 26, a first cover panel 28, and a second cover panel 30. First and second fastening panels 24, 26 are positioned on a first lateral side and a second lateral side, respectively, of animal 11, upon vest assembly. First and second cover panels 28, 30 are positioned over first and second fastening panels, respectively, upon vest assembly. Each panel includes an inner surface configured to face toward animal 11 and an outer surface configured to face away from animal 11. Materials from which the panels may be fabricated include natural fibers such as cotton, hemp, wool and silk, synthetic fibers such as nylon, rayon, polyester, acrylic and spandex, polymers, plastics or other suitable materials for adjustable panel construction. Attachment materials are present on one or both of the inner and outer surfaces of the panels. Suitable attachment materials include Velcro® fastens, hooks, snaps, buttons, magnets, zippers, or any other suitable structure or material capable of detachably fastening panels to each other, as discussed in detail below.

Figure 3A:
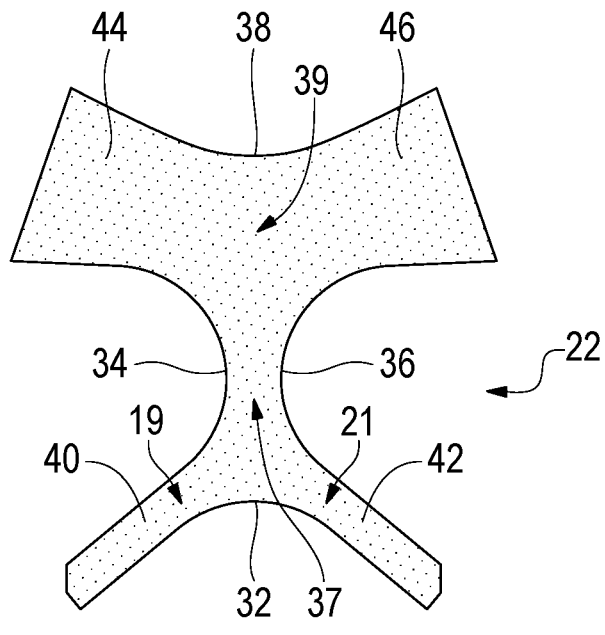
FIG. 3A depicts an inner surface of an attachment panel of the dog vest assembly of FIG. 2
Figure 3B:
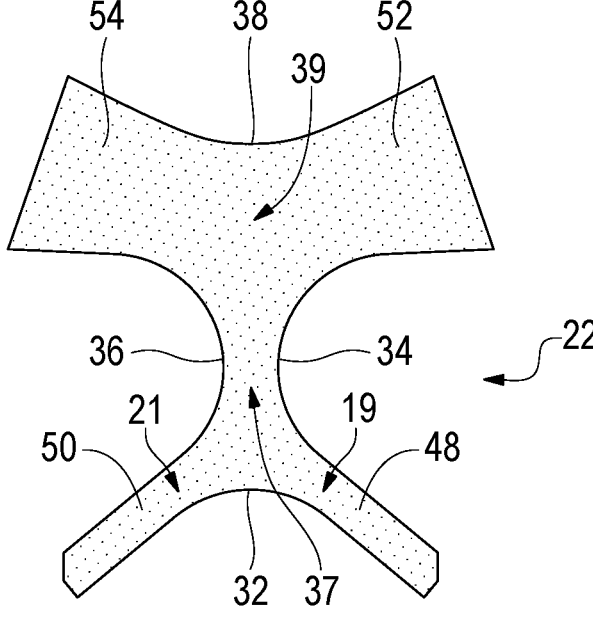
FIG. 3B depicts an outer surface of the attachment panel of FIG. 3A.

Referring to FIGS. 3A and 3B, attachment panel 22 is shown with its inner surface (FIG. 3A) and outer surface (FIG. 3B) visible. To conform and adjust to the shape and size of animal 11, attachment panel 22 includes several curved surfaces and regions for receiving and or covering certain bodily features of animal 11. These curved regions include a neck curve 32, a first shoulder curve 34, a second shoulder curve 36 and a waist curve 38. Neck curve 32 is positioned between neck 12 and chest 16 on the underside of animal 11 upon assembly. Strips 19, 21 of panel material support attachment panel 22 between neck curve 32 and each of first and second shoulder curves 34, 36. Additionally, a strip 37 of panel material divides first and second shoulder curves 34, 36 and extends longitudinally between about neck 12 and waist 18 of animal 11. Strips 19, 21 and 37 combine to form a substantially U-shaped portion of attachment panel 22.

First and second shoulder curves 34, 36 are positioned along the underside of shoulders 14 on the first and second lateral sides, respectively, of animal 11 upon assembly. Waist curve 38 is positioned near the underside of waist 18 of animal 11 upon assembly. Between first and second shoulder curves 34, 36 and waist curve 38 is a strip 39 of panel material that extends along chest 16, torso 20, and waist 18 of animal 11 upon assembly. Strips 37 and 39 form a substantially T-shaped portion of attachment panel 22. Strips 19, 21, 37 and 39 are unitary in construction, though in some instances individual, separable strips may be used.

Surfaces of attachment panel 22 include multiple attachment sections for detachably coupling to fastening panels 24, 26. These attachment sections are formed by or include one or more of the attachment materials identified above and may include the entire surface of attachment panel 22 or, as shown in FIGS. 3A and 3B, be located at particular points along attachment panel 22. In one embodiment, attachment sections may include a hook-and-loop type fastener such as a Velcro® fastener, which includes male hooks and/or a female loops. FIG. 3A displays the inner surface of attachment panel 22 with a plurality of female loop sections at particular locations. In some embodiments, there are two or more female loop sections on the inner surface of attachment panel 22. In the depicted embodiment, at least one first section 40 of female loop fasteners is positioned on strip 19 of panel material between first shoulder curve 34 and neck curve 32, at least one second section 42 of female loop fasteners is positioned on strip 21 of panel material between second shoulder curve 36 and neck curve 32, at least one third section 44 of female loop fasteners is positioned on strip 39 of panel material between first shoulder curve 34 and waist curve 38 and at least one fourth section 46 of female loop fasteners is positioned on strip 39 of panel material between second shoulder curve 36 and waist curve 38.

FIG. 3B displays the outer surface of attachment panel 22 with a plurality of male hook sections at particular locations. In some embodiments, there are two or more male hook sections on the outer surface of attachment panel 22. In the depicted embodiment, at least one first section 48 of male hook fasteners is positioned on strip 19 of panel material between first shoulder curve 34 and neck curve 32, at least one second section 50 of male hook fasteners is positioned on strip 21 of panel material between second shoulder curve 36 and neck curve 32, at least one third section 52 of male hook fasteners is positioned on strip 39 of panel material between first shoulder curve 34 and waist curve 38 and at least one fourth section 54 of male hook fasteners is positioned on strip 39 of panel material between second shoulder curve 36 and waist curve 38. Other positions of the plurality of hoop or loop fastener sections are contemplated in the present disclosure, such that attachment panel 22 is configured to be detachably and operatively coupled to first and second fastening panels 24, 26 and positioned on an underside of animal 11 between about its neck 12 and about its waist 18. Additionally, other positions of a plurality of attachment sections are contemplated in the present disclosure, such that attachment panel 22 is configured to be attached to first and second fastening panels 24, 26 and positioned on an underside of animal 11 between about its neck 12 and about its waist 18.

Figure 4A:
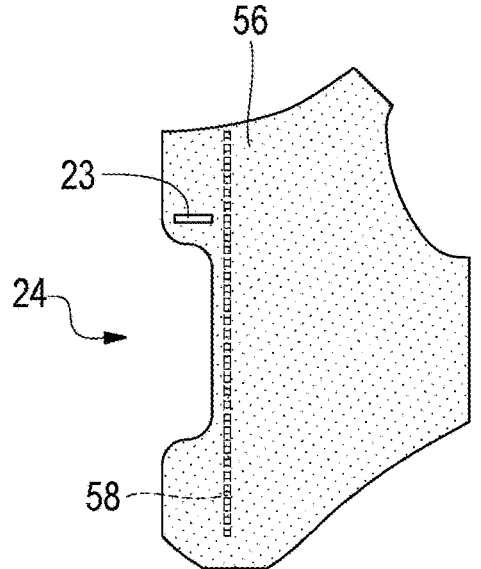
FIG. 4A depicts an outer surface of a first fastening panel of the dog vest assembly of FIG. 2.
Figure 4B:
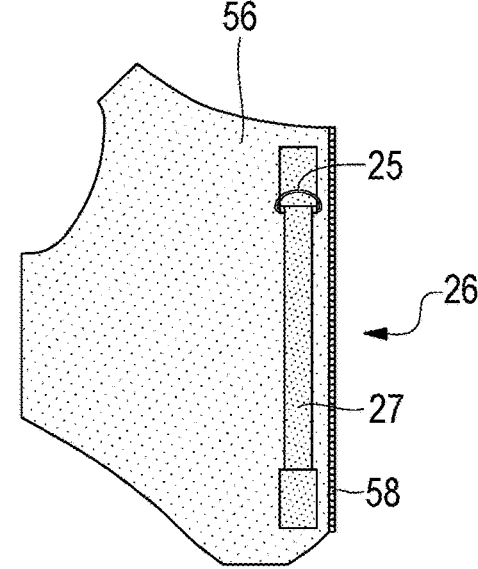
FIG. 4B depicts an outer surface of a second fastening patent of the dog vest assembly of FIG. 2.
Figure 5:
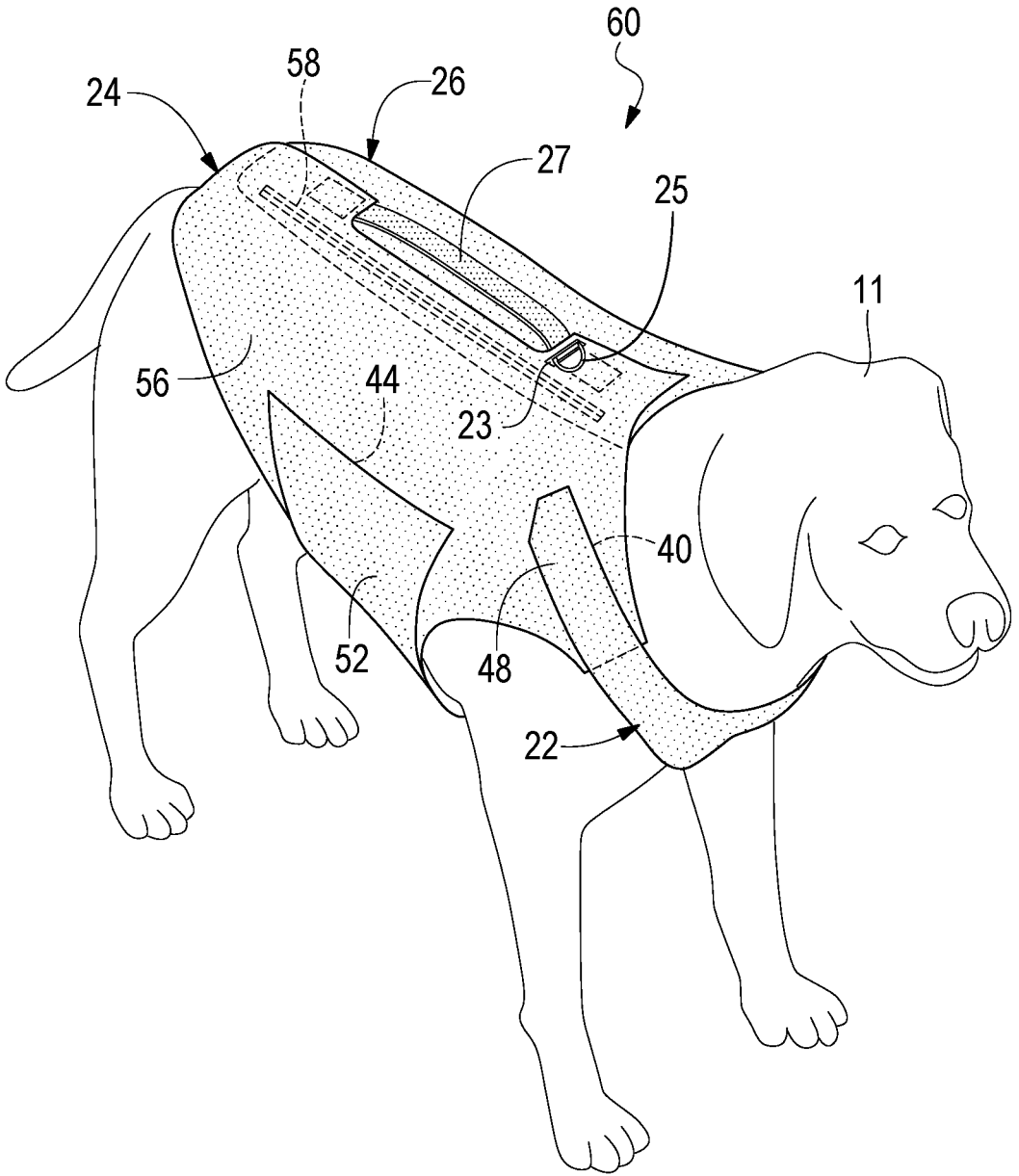
FIG. 5 is a perspective view of an inner vest structure formed by the assembly of the attachment panel, the first fastening panel, and the second fastening panel of FIG. 2 on a dog.

FIGS. 4A and B depict an outer surface of each of first and second fastening panels 24, 26. To conform with and fit the features of animal 11, first and second fastening panels 24, 26 include curved regions for fitting about the shoulders 14, neck 12, and hips of animal 11. Strips of panel material forming first and second fastening panels 24, 26 are unitary in construction in some instances or contain individual strips attached to each other by any suitable attachment means in other instances. First fastening panel 24 is designed to at least partially cover the first lateral side of animal 11, and second fastening panel 26 is designed to at least partially cover the second lateral side of animal 11 upon assembly. Surfaces of first and second fastening panels 24, 26 include at least one attachment section for attachment to attachment panel 22 and first and second cover panels 28, 30. At least one attachment section includes several attachment sections located at particular points along first and second fastening panels 24, 26 in some instances, or, as shown in FIGS. 4A and 4B, include the entire surfaces of first and second fastening panels 24, 26. In the embodiment depicted in FIGS. 4A and 4B, one attachment section on each of first and second fastening panels 24, 26 includes the entire outer surface of each of first and second fastening panels 24, 26. In embodiments not depicted, one attachment section on each of first and second fastening panels 24, 26 includes the entire inner surface of each of first and second fastening panels 24, 26. In yet another embodiment not depicted, attachment sections on each of first and second fastening panels 24, 26 include the entire inner and outer surfaces of each of first and second fastening panels 24, 26. Attachment sections of first and second fastening panels 24, 26 are positioned on the inner surface of one of first and second fastening panels 24, 26 and the outer surface of the other of first and second fastening panels 24, 26 in some instances or, as depicted in FIGS. 4A and 4B, are positioned on the inner or on the outer surface of both of first and second fastening panels 24, 26. Similarly, attachment sections of first and second fastening panels 24, 26 include several attachment sections for one of first and second fastening panels 24, 26 and one attachment section for the other of first and second fastening panels 24, 26 in some instance, include several attachment sections for both first and second fastening panels 24, 26 in other instances, or, as depicted in FIGS. 4A and 4B, include one attachment section for both first and second fastening panels 24, 26.

In the embodiment depicted in FIGS. 4A and 4B, attachment sections are a plurality of hoop-and-loop fastener sections on the outer surfaces of each of first and second fastening panels 24, 26. FIG. 4A shows first fastening panel 24 with a male hook section 56 on a first outer fastening surface that faces away from animal 11. FIG. 4B shows second fastening panel 26 with male hook 56 on a second outer fastening surface that faces away from animal 11. In embodiments not depicted, one or both of first and second fastening panels 24, 26 utilizes female loop fasteners 62 when complementary male hook fasteners 56 are present on adjacent facing surfaces locations of attachment panel 22 and when complementary male hook fasteners 56 are present on adjacent facing surface locations of first and/or second cover panels 28, 30, such that first and second fastening panels 24, 26 are configured to attach to attachment panel 22 and be positioned on the first and second lateral sides, respectively, of animal 11. In the embodiment depicted in FIGS. 4A and 4B, first fastening panel 24 is placed on the first lateral side of animal 11 upon assembly and second fastening panel 26 is placed on the second lateral side of animal 11 upon assembly. First and second fastening panels 24, 26 extend from approximately neck 12 to approximately waist 18 of animal 11 upon assembly. First and second fastening panels 24, 26 each include a means of attachment to each other along their ends that are configured to be spine-adjacent during assembly, relative to the spine of animal 11. In one embodiment, first and second fastening panels 24, 26 each include complementary tracks of a zipper 58 along their spine-adjacent ends, such that the attachment of first and second fastening panels 24, 26 along the spine of animal 11 is achieved by zipping of zipper 58, as depicted in FIG. 5.

Additional features for animal restraint or securement are displayed in the embodiment in FIGS. 4A and 4B, though these features are absent or altered in other embodiments not shown. FIG. 4A depicts a fastening panel ring slot 23 on first fastening panel 24 through which a ring 25 is configured to fit and be accessible. The location and size of fastening panel ring slot 23 is such that ring 25 aligns with and fits through fastening panel ring slot 23 upon a vest assembly. FIG. 4B shows ring 25 and a handle 27 located such that each will be near the spine of animal 11 upon assembly. Ring 25 is a D-ring in the depicted embodiment, though is a circular, oval, quadrilateral, or otherwise-shaped ring in embodiments not shown. Ring 25 is constructed of a material that withstands pressure and force without deformation, such as metals, and is attached to second fastening panel 26 using stitching or other suitable attachment means. Handle 27 is depicted as being oriented parallel to the spine of animal 11 when adjustable animal vest 10 is assembled, though other orientations are possible. Handle 27 is constructed of cloth, fibers, metal-enforced, fibers, metal, plastic, polymers, or other suitable materials for gripping and secure attachment to second fastening panel 26. Handle 27 is attached to second fastening panel 26 using stitching or other suitable attachment means. In embodiments not shown, the features on fastening panels 24, 26 are reversed, such that fastening panel ring slot 23 is on second fastening panel 26 and ring 25 and handle 27 are on first fastening panel 24. In yet other embodiments not depicted, handle 27 is located on the same panel in which fastening panel ring slot 23 is located. Some embodiments include only one of handle 27 and the combination of fastening panel ring slot and ring 25, or include neither handle 27 nor the combination of fastening panel ring slot and ring 25.

Referring now to FIG. 5, an inner vest structure 60 is formed by the attachment of attachment panel 22 with first and second fastening panels 24, 26. Assembly of inner vest structure 60 is initiated by providing animal 11 to be outfitted with adjustable animal vest 10 and attaching first and second fastening panels 24, 26 along the spine of animal 11, where first fastening panel 24 is placed on the first lateral side of animal 11 and has male hook section 56 on the first outer fastening surface that faces away from animal 11, and where second fastening panel 26 is placed on the second lateral side of animal 11 and has male hook section 56 on the second outer fastening surface that faces away from animal 11. Attachment of first and second fastening panels 24, 26 along the spine of animal 11 is achieved using zipper 58 connecting a spine-adjacent end of first fastening panel 24 with a spine-adjacent end of second fastening panel 26. Other suitable attachment means for attaching first fastening panel 24 to second fastening panel 26 are contemplated for use in the present disclosure. As shown in FIG. 5, ring 25 and fastening panel ring slot 23 are aligned and placed such that ring 25 fits through fastening panel ring slot 23 and such that handle 27 is accessible from the outer surface of inner vest structure 60. Following placement and attachment of first and second fastening panels 24, 26, attachment panel 22 is fastened to first and second fastening panels 24, 26. In some instances, this fastening occurs prior to attachment between first and second fastening panels 24, 26, such as when adjustable animal vest 10 has been pre-fitted to animal 11. It is envisioned that a pre-fitted adjustable animal vest 10 is quickly attached to animal 11 by zipping zipper 58, as panel fitting has previously been performed and adjustable areas have previously been attached in a desired conformation. For attachment of first and second fastening panels 24, 26 to attachment panel 22, at least one first section 40 of female loop fasteners and at least one third section 44 of female loop fasteners on the inner surface of attachment panel 22 fastens to male hook section 56 of first outer fastening surface of first fastening panel 24 and at least one second section of female loop section 42 and at least one fourth section 46 of female loop fasteners on the inner surface of attachment panel 22 fastens to male hook section 56 of second outer fastening surface of second fastening panel 26. Inner vest structure 60 results from the attachment of first and second fastening panels 24, 26 to attachment panel 22, which are quickly attached or removed from animal 11 using zipper 58 without the need to detach any hoop-and-loop fastener sections or other attachment points. In FIG. 5, inner vest structure 60 includes an outer surface with male hook fasteners 56 exposed from panel components, such that first and second cover panels 28, 30 are configured to be attached. In embodiments not depicted where first and second cover panels 28, 30 include an inner surface with male hook section 56, inner vest structure 60 panels are produced such that the outer surface of inner vest structure 60 includes female loop section 62 exposed from panel components.

Referring to FIGS. 6A and B, inner surfaces of first and second cover panels 28, 30 are displayed. To conform with and fit the features of animal 11, first and second cover panels 28, 30 include curved regions for fitting about the shoulders 14, neck 12, and hips of animal 11. Strips of panel material forming first and second cover panels 28, 30 are unitary in construction in some instances or contain individual strips attached to each other by any suitable attachment means in other instances. First cover panel 28 is configured to at least partially cover the first lateral side of animal 11, and second cover panel 30 is configured to at least partially cover the second lateral side of animal 11 upon assembly. Surfaces of first and second cover panels 28, 30 include at least one attachment section for attachment to attachment panel 22 and first and second fastening panels 24, 26. At least one attachment section includes several attachment sections located at particular points along first and second cover panels 28, 30 in some instances, or, as shown in the depicted embodiment, includes the entire surfaces of first and second cover panels 28, 30. In the embodiment depicted in FIGS. 6A and 6B, one attachment section on each of first and second cover panels 28, 30 includes the entire inner surface of each of first and second cover panels 28, 30. In embodiments not depicted, one attachment section on each of first and second cover panels 28, 30 includes the entire outer surface of each of first and second cover panels 28, 30. In yet another embodiment not depicted, attachment sections on each of first and second cover panels 28, 30 include the entire inner and outer surfaces of each of first and second cover panels 28, 30. Attachment sections of first and second cover panels 28, 30 are positioned on the inner surface of one of first and second cover panels 28, 30 and the outer surface of the other of first and second cover panels 28, 30 in some instances or, as depicted in FIGS. 6A and 6B, are positioned on the inner or on the outer surface of both of first and second cover panels 28, 30. Similarly, attachment sections of first and second cover panels 28, 30 include several attachment sections for one of first and second cover panels 28, 30 and one attachment section for the other of first and second cover panels 28, 30 in some instances, include several attachment sections for both first and second cover panels 28, 30 in other instances or, as depicted in FIGS. 6A and 6B, include one attachment section for both first and second cover panels 28, 30.

In the embodiment depicted in FIGS. 6A and 6B, attachment sections are a plurality of hoop-and-loop fastener sections on the inner surfaces of each of first and second cover panels 28, 30. FIG. 6A shows first cover panel 28 with female loop section 62 on a first inner cover surface that faces towards animal 11. FIG. 6B shows second cover panel 30 with female loop section 62 on a second inner cover surface that faces towards animal 11. In embodiments not depicted, one or both of first and second cover panels 28, 30 utilizes male hook section 56 when complementary female loop section 62 is present on adjacent facing surface locations of attachment panel 22 and when complementary male hook section 56 is present on adjacent facing surfaces locations of first and/or second fastening panels 24, 26 or attachment panel 22, such that first and second cover panels 28, 30 are configured to attach to attachment panel 22 and first and second fastening panels 24, 26, and are configured to be positioned on the first and second lateral sides, respectively, of animal 11. In the embodiment depicted in FIGS. 6A and 6B, first cover panel 28 is placed on the first lateral side of animal 11 upon assembly and second cover panel 30 is placed on the second lateral side of animal 11 upon assembly. First and second cover panels 28, 30 extend from approximately neck 12 to approximately waist 18 of animal 11 upon assembly.

Additional features for animal restraint or securement are displayed in the embodiment in FIGS. 6A and 6B, though these features are absent or altered in other embodiments not shown. FIG. 6A depicts a cover panel ring slot 29 on first cover panel 28 through which ring 25 is configured to fit and be accessible. The location and size of cover panel ring slot 29 is such that ring 25 aligns with and fits through cover panel ring slot 29 upon a vest assembly. FIG. 6B shows a cover panel handle flap 31 located such that each will be near the spine of animal 11 upon assembly. Cover panel handle flap 31 includes an upper flap slit 33 and a lower flap slit 35 that each extend into second cover panel 30 and determine the size of the opening formed when cover panel handle flap 31 is opened. The dimensions of cover panel handle flap 31 are such that it covers handle 27 upon vest assembly and is configured to open and reveal handle 27 upon vest assembly, when access to handle 27 is desired. The location of cover panel handle flap 31 is such that it aligns with the location of handle 27 upon vest assembly. In the depicted embodiment, both cover panel ring slot 29 and cover panel handle flap 31 are present, though in embodiments not shown only one or neither of cover panel ring slot 29 and cover panel handle flap 31 are present. In some embodiments not shown, cover panel ring slot 29 is located on second cover panel 30 and cover panel handle flap 31 is located on first cover panel 28. However, cover panel ring slot 29 is located on the same side of animal 11 as fastening panel ring slot 23 and on the opposite side of animal 11 as ring 25 upon vest assembly. Similarly, cover panel handle flap 31 is located on the same side of animal 11 as handle 27 upon vest assembly.

Referring now to FIGS. 7A and 7B, first cover panel 28 is attached to first fastening panel 24 and attachment panel 22 of inner vest structure 60 on animal 11. FIG. 7A shows an open configuration, where first cover panel 28 is not in position over first fastening panel 24. FIG. 7B displays a closed configuration of first cover panel 28, where at least one first and third section of male hook sections 48, 52 of attachment panel 22 and male hook section 56 of the first outer fastening surface attach to female loop section 62 of the first inner cover surface of first cover panel 28.

In FIGS. 8A and 8B, second cover panel 30 is attached to second fastening panel 26 and attachment panel 22 of inner vest structure 60 on animal 11. FIG. 8A shows an open configuration, where second cover panel 30 is not in position over second fastening panel 26. FIG. 8B displays a closed configuration of second cover panel 30, where at least one second and fourth section of male hook sections 50, 54 of attachment panel 22 and male hook section 56 of the second outer fastening surface attach to female loop section 62 of the second inner cover surface of second cover panel 30.

FIG. 9 depicts a top view of adjustable animal vest 10, resulting from the attachment of first and second fastening panels 24, 26 to attachment panel 22 to form inner vest structure 60 and attachment of first and second cover panels 28, 30 to inner vest structure 60. In instances where first and second cover panels 28, 30 do not obstruct zipper 58, adjustable animal vest 10 is capable of becoming quickly attached or removed from animal 11 using zipper 58 without the need to detach any hoop-and-loop fastener sections or other attachment points. In these instances, adjustable animal vest 10 is capable of being pre-assembled to fit animal 11 and placement of pre-assembled adjustable animal vest 10 does not require attachment or adjustment of hoop-and-loop fastener attachment sections. In the depicted embodiment, handle 27 and ring 25 are configured to be accessible. Handle 27 is accessible when cover panel handle flap 31 is open and is covered when cover panel handle flap 31 is closed. Ring 25 is accessible through fastening panel ring slot 23 and cover panel ring slot 29. The assembly of adjustable animal vest 10 is undertaken so that, when handle 27 and ring 25 are present as depicted, the cover panel containing cover panel ring slot 29 is placed over the fastening panel containing fastening panel ring slot 23, and the cover panel containing cover panel handle flap 31 is placed over the fastening panel containing handle 27. Cover panels 28, 30 are completely removable and replaceable from assembly on fastening panels 24, 26 in instances such as that depicted. However, in other instances cover panels 28, 30 are at least partially permanently attached fastening panels 24, 26 prior to assembly.

In FIG. 10, adjustable animal vest 10 is viewed from a vantage point below animal 11, such that the underside of animal 11 is visible. Attachment panel 22 is displayed to fit between approximately neck 12 and approximately waist 18 of animal 11. The fit of panels forming adjustable animal vest 10 is adjustable by altering the attachment of hoop-and-loop fastener attachment sections of the panels. Adjustable animal vest 10 is configured to provide a suitable adjustable fit according to the following exemplary universal configuration sizing: neck ranging from about 12.5 inches to about 28 inches in circumference, chest ranging from about 22 inches to about 39 inches in circumference, and waist ranging from about 18.5 inches to about 35 inches in circumference. A smallest exemplary configuration includes the following sizing: neck circumference as small as 12.5 inches, chest circumference as small as 22 inches, and waist circumference as small as 18.5 inches. A largest exemplary configuration includes the following sizing: neck circumference as large as 28 inches, chest circumference as large as 39 inches, and waist circumference as large as 35 inches. Sizing is exemplary, and is contemplated to be scalable for sizes outside the stated exemplary ranges and for animal 11 body shapes varying from the depicted examples.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

We claim:

1. A quadruped vest assembly comprising:
a chest panel configured for covering a chest of a quadruped, the chest panel including a neck edge configured for at least partially encircling a neck of the quadruped, a first shoulder edge configured for at least partially encircling a first shoulder of the quadruped, a second shoulder edge configured for at least partially encircling a second shoulder of the quadruped, and a waist edge wherein the neck edge and the first shoulder edge define at least in part a first strip, the neck edge and the second shoulder edge defining at least in part a second strip, the first shoulder edge and the waist edge defining at least in part a third strip, and the second shoulder edge and the waist edge defining at least in part a fourth strip,
a first panel configured for covering a first side of the quadruped,
a second panel configured for covering a second side of the quadruped,
a first fastener assembly configured for detachably coupling the chest panel with the first panel, the first fastener assembly including a first portion connected to the first strip and a second portion attached to the first panel,
a second fastener assembly configured for detachably coupling the chest panel with the second panel, the second fastener assembly including a third portion connected to the second strip and a fourth portion attached to the second panel,
a third fastener assembly configured for detachably coupling the chest panel with the first panel, the third fastener assembly including a fifth portion connected to the third strip and a sixth portion attached to the first panel, wherein the fifth portion extends to and between the first shoulder edge and the waist edge,
a fourth fastener assembly configured for detachably coupling the chest panel with the second panel, the fourth fastener assembly including a seventh portion connected to the fourth strip and an eighth portion attached to the second panel, wherein the seventh portion extends to and between the second shoulder edge and the waist edge, and
a fifth fastener assembly configured for detachably coupling the first panel with the second panel.

2. The assembly of claim 1, wherein the first portion of the first fastener assembly is sandwiched between the first panel and a third panel covering at least in part the first panel and the third portion of the second assembly is sandwiched between the second panel and a fourth panel covering at least a portion of the second panel.

3. The assembly of claim 1, wherein (i) the chest panel is detachably coupled to the first panel using the first fastener assembly and the third fastener assembly thereby forming a first opening configured for receiving a first shoulder of the quadruped, (ii) the chest panel is detachably coupled to the second panel using the second fastener assembly and the fourth assembly thereby forming a second opening configured for receiving a second shoulder of the quadruped, (iii) the first panel is detachably coupled to the second panel utilizing the fifth fastener assembly, and (iv) the chest panel, the first panel and the second panel form a third opening configured for receiving a neck of the quadruped.

4. The assembly of claim 1, wherein the chest panel further includes a fifth strip that is integrally formed with the first strip, the second strip, the third strip and the fourth strip thereby providing the chest panel with a unitary construction.

5. The assembly of claim 1, wherein the second panel includes an edge with a concave portion defining a slot, the edge of the second panel being arranged to extend lengthwise along a spine of the quadruped when the quadruped vest assembly is assembled on the quadruped and wherein the first panel includes a handle and the slot is configured for receiving the handle when the quadruped vest assembly is assembled on the quadruped.

6. The assembly of claim 5, wherein the edge defining the slot is a peripheral edge of the second panel, and the handle is configured to extend through the slot.

7. The assembly of claim 1, wherein, when each of the first fastener assembly, the second fastener assembly, the third fastener assembly and the fourth fastener assembly is a hook and loop assembly, a waist circumference, a neck circumference and a chest circumference of a vest formed from the assembly are adjustable by altering attachment of the first portion with the second portion, the third portion with the fourth portion, the fifth portion with the sixth portion and the seventh portion with the eighth portion.

8. The assembly of claim 7, wherein the vest includes a neck circumference length that is adjustable from between about 12.5 inches to about 28 inches.

9. The assembly of claim 7, wherein the vest includes a chest circumference length that is adjustable from between about 22 inches to about 39 inches.

10. The assembly of claim 7, wherein the vest includes a waist circumference length that is adjustable from between about 18.5 inches to about 35 inches.

11. An adjustable quadruped vest assembly comprising:

an attachment panel for placement between a neck and a waist of an underside of a quadruped, the attachment panel including attachment features having inner attachment features on an inner attachment panel surface configured to face towards the quadruped and outer attachment features on an outer attachment panel surface configured to face away from the quadruped, a first panel for placement on a first lateral side of the animal, the first panel including outer fastening features on a first outer surface configured to face away from the quadruped, a second panel for placement on a second lateral side of the quadruped, the second panel including outer fastening features on a second fastening surface configured to face away from the quadruped, a third panel for placement over at least a portion of the first panel on the first lateral side of the quadruped, the third panel including inner fastening features on a first inner surface configured to face towards the quadruped, and a fourth panel for placement over at least a portion of the second panel on the second lateral side of the quadruped, the fourth panel including inner fastening features on a second inner surface configured to face towards the quadruped;

wherein the inner attachment features of the attachment panel are configured to fasten to the outer fastening features of the first and second panels and the first and second panels are configured to be attached along a spine of the quadruped, and wherein the outer attachment features of the attachment panel and the outer fastening features of the first panel are configured to attach to the inner fastening features of the third panel, and the outer attachment features of the attachment panel and the outer fastening features of the second panel are configured to attach to the inner fastening features of the fourth panel, and wherein each of the attachment features is selected from the group consisting of a snap assembly, a magnet assembly, a zipper assembly and a hook-and-loop assembly.

12. The assembly of claim 11, wherein the attachment panel includes a plurality of concave edges including a neck edge configured for at least partially encircling a neck of the quadruped, a first shoulder edge configured for at least partially encircling a first shoulder of the quadruped, and a second shoulder edge configured for at least partially encircling a second shoulder of the quadruped.

13. The assembly of claim 11, wherein each of the first panel and the second panel includes a plurality of concave edges including a neck edge configured for at least partially encircling a neck of the quadruped, a first shoulder edge configured for at least partially encircling a first shoulder of the quadruped, and a second shoulder edge configured for at least partially encircling a second shoulder of the quadruped.

14. The assembly of claim 11, wherein each of the third panel and the fourth panel includes a plurality of concave edges including a neck edge configured for at least partially encircling a neck of the quadruped, a first shoulder edge configured for at least partially encircling a first shoulder of the quadruped, and a second shoulder edge configured for at least partially encircling a second shoulder of the quadruped.

15. The assembly of claim 11, wherein the first panel includes a handle and the second panel, the third panel and the fourth panel define at least in part an opening through which the handle extends.

16. The assembly of claim 11, wherein the first panel and the second panel are detachably coupled to one another by a zipper assembly.

17. The assembly of claim 11, wherein one or more of the first panel, the second panel, the third panel and the fourth panel include insulation.

18. The assembly of claim 11, wherein one or more of the first panel, the second panel, the third panel and the fourth panel include a buoyant material.

19. A method of assembling the quadruped vest assembly of claim 11 comprising:

positioning an attachment panel on a chest of a quadruped, positioning a first panel on a first lateral side of the quadruped, positioning a second panel on a second lateral side of the quadruped, detachably coupling the chest panel to the first panel and the second panel, detachably coupling the first panel to the second panel, detachably coupling the third panel to the first panel, and detachably coupling the fourth panel to the second panel.

20. The method of claim 19, further including encircling a neck of the quadruped, a first shoulder of the quadruped, and a second shoulder the quadruped with the attachment panel, the first panel and the second panel.

21. The method of claim 19, further including encircling a neck of the quadruped, a first shoulder of the quadruped, and a second shoulder the quadruped with the attachment panel, the third panel and the fourth panel.

22. The method of claim 19, further including detachably coupling the attachment panel to the first panel and the second panel, the third panel to the first panel and the fourth panel to the second panel using hook-and-loop fasteners.

23. A quadruped vest comprising:

a chest panel configured for covering a chest of a quadruped, the chest panel including a neck side configured for at least partially encircling a neck of the quadruped, a first shoulder side configured for at least partially encircling a first shoulder of the quadruped, a second shoulder side configured for at least partially encircling a second shoulder of the quadruped, and a waist side wherein the neck side and the first shoulder side form a first strip therebetween, the neck side and the second shoulder side form a second strip therebetween, the first shoulder side and the waist side form a third strip therebetween, and the second shoulder side and the waist side form a fourth strip therebetween, a first panel configured for covering a first side of the quadruped, wherein the first panel includes a handle, a second panel configured for covering a second side of the quadruped, wherein the second panel includes a peripheral edge defining a concave slot, the peripheral edge of the second panel being arranged to extend lengthwise along a spine of the quadruped when the quadruped vest assembly is assembled on the quadruped, and wherein the handle is configured to extend through the concave slot, a first hook and loop fastener assembly detachably coupling the chest panel with the first panel, the first fastener assembly including a first portion connected to the first strip and a second portion attached to the first panel, a second hook and loop fastener assembly detachably coupling the chest panel with the second panel, the second fastener assembly including a third portion connected to the second strip and a fourth portion attached to the second panel, a third hook and loop fastener assembly detachably coupling the chest panel with the first panel, the third fastener assembly including a fifth portion connected to the third strip and a sixth portion attached to the first panel, wherein the fifth portion extends to and between the first shoulder side and the waist side, a fourth hook and loop fastener assembly detachably coupling the chest panel with the second panel, the fourth fastener assembly including a seventh portion connected to the fourth strip and an eighth portion attached to the second panel, wherein the seventh portion extends to and between the second shoulder side and the waist side, a zipper assembly detachably coupling the first panel with the second panel.

24. The vest of claim 23 including an adjustable neck circumference, wherein the adjustable neck circumference is adjusted by altering attachment of the first portion with the second portion and the third portion with the fourth portion, and an adjustable waist circumference, wherein the adjustable waist circumference is adjusted by altering attachment of the fifth portion with the sixth portion and the seventh portion with the eighth portion.

* * * * *